United States Patent
Talaat et al.

(10) Patent No.: US 7,512,695 B2
(45) Date of Patent: Mar. 31, 2009

(54) METHOD AND SYSTEM TO CONTROL THE COMMUNICATION OF DATA BETWEEN A PLURALITY OF INTERCONNECT DEVICES

(75) Inventors: Mohamed Magdy Talaat, San Jose, CA (US); Rick Reeve, San Francisco, CA (US); Richard L. Schober, Cupertino, CA (US); Prasad Vajjhala, San Jose, CA (US); Yolin Lih, San Jose, CA (US); Dev Datta, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 967 days.

(21) Appl. No.: 10/431,973

(22) Filed: May 7, 2003

(65) Prior Publication Data

US 2005/0021797 A1    Jan. 27, 2005

(51) Int. Cl.
*G06F 15/16* (2006.01)
(52) U.S. Cl. .................... 709/230; 709/224; 370/395.5; 370/464; 370/469; 710/315; 710/105
(58) Field of Classification Search ................. 709/230, 709/224, 249, 245, 238; 370/389, 392, 423, 370/466, 395.5, 464, 469; 710/306, 316, 710/315, 105
See application file for complete search history.

(56) References Cited

U.S. PATENT DOCUMENTS

| | | | |
|---|---|---|---|
| 5,617,419 A | 4/1997 | Christensen et al. | |
| 6,044,406 A | 3/2000 | Barkey | |
| 6,601,210 B1* | 7/2003 | Kagan | 714/758 |
| 6,622,193 B1* | 9/2003 | Avery | 710/263 |
| 6,778,548 B1* | 8/2004 | Burton et al. | 370/429 |
| 6,862,278 B1* | 3/2005 | Chang et al. | 370/389 |
| 6,988,161 B2* | 1/2006 | McConnell et al. | 710/316 |
| 7,017,020 B2* | 3/2006 | Herbst et al. | 711/167 |
| 7,161,948 B2* | 1/2007 | Sampath et al. | 370/402 |
| 7,277,425 B1* | 10/2007 | Sikdar | 370/366 |
| 2004/0001487 A1* | 1/2004 | Tucker et al. | 370/389 |
| 2004/0062244 A1 | 4/2004 | Gill et al. | |
| 2004/0109473 A1* | 6/2004 | Lebizay et al. | 370/466 |

FOREIGN PATENT DOCUMENTS

EP    1049019 A1    10/1999

* cited by examiner

*Primary Examiner*—Nathan J Flynn
*Assistant Examiner*—Mohammad A Siddiqi

(57) ABSTRACT

A method and system of communicating data between a source interconnect device and a destination interconnect device are defined. The method includes adding an identification component to the data at the source interconnect device prior to communicating the data, and extracting the identification component at the destination interconnect device. The identification component is then processed at the destination interconnect device, the identification component relating to the contents of the data. The invention extends to a machine-readable medium embodying a set of instructions for executing the method and to an interconnect device.

8 Claims, 13 Drawing Sheets

Crossbar Data

| Tag 82 | | 84 | Data | |
|---|---|---|---|---|
| Value | Meaning | Value | | Meaning |
| 0 0 | Null | 0 0 0 0 0 0 0 0 | | Null - nothing is driven |
| | | all others | | Illegal |
| 0 1 | Escape | 0 0 0 0 0 0 0 0 | | Null - Intra-packet gap |
| | | 0 0 0 0 0 0 1 0 | | VL, TBS, IP Message Header |
| | | 0 0 0 0 0 0 1 1 | | VL, TBS, IP Message Header; Lifetime Timout |
| | | 0 0 0 0 0 1 0 0 | | End of Bad Packet (EBP) |
| | | 1 1 0 0 0 0 0 0 | K28.5 | COM  Comma |
| | | 1 1 0 0 0 0 0 1 | K27.7 | SDP  Start of Data Packet |
| | | 1 1 0 0 0 0 1 0 | K28.2 | SLP  Start of Link Packet |
| | | 1 1 0 0 0 0 1 1 | K29.7 | EGP  End of Good Packet |
| | | 1 1 0 0 0 1 0 0 | K30.7 | EBP  End of Bad Packet |
| | | 1 1 0 0 0 1 0 1 | K23.7 | PAD  Pad |
| | | 1 1 0 0 0 1 1 0 | K28.0 | SKP  Skip |
| | | 1 1 0 0 0 1 1 1 | K28.1 | |
| | | 1 1 0 0 1 0 0 0 | K28.7 | |
| | | 1 1 0 0 1 0 0 1 | K28.3 | |
| | | 1 1 0 0 1 0 1 0 | K28.4 | |
| | | 1 1 0 0 1 0 1 1 | K28.6 | |
| | | 1 1 0 0 1 1 0 0 | Idle | |
| | | 1 1 1 1 0 0 0 0 | | Start Raw String |
| | | 1 1 1 1 0 0 0 1 | | End Raw String |
| | | all others | | Reserved |
| 1 0 | Data | d d d d d d d d | | Packet data except for last byte |
| 1 1 | Mark | d d d d d d d d | | Last data byte of a good packet |

FIG. 6

Normal Packet Transfer Sequence

| Tag | Data |
|---|---|
| DATA : | first byte of packet (LRH byte 0) |
| DATA : | second byte of packet |
| DATA : | third byte of packet |
| DATA : | fourth byte of packet |
| : | : |
| DATA : | fourth-to-last byte of packet |
| DATA : | third-to-last byte of packet |
| DATA : | second-to-last byte of packet |
| MARK : | last byte of packet |
| ESC : | VL, TBS, IP Message Header |
| DATA : | VL, TBS[11:08] |
| DATA : | TBS[07:00] |
| DATA : | IP (input port) |

FIG. 11

Truncated Packet Transfer Sequence

| Tag | Data |
|---|---|
| DATA : | first byte of packet (LRH byte 0) |
| DATA : | second byte of packet |
| : | |
| DATA : | packet data byte |
| ESC : | End of Bad Packet |
| ESC : | VL, TBS, IP Message Header |
| DATA : | VL, TBS[11:08] |
| DATA : | TBS[07:00] |
| DATA : | IP (input port) |

FIG. 12

Cancelled Packet Transfer Sequence

| Tag | Data |
|---|---|
| ESC : | VL, TBS, IP Message Header |
| DATA : | VL, TBS[11:08] |
| DATA : | TBS[07:00] |
| DATA : | IP (input port) |

FIG. 13

Packet in a Raw String

| Tag | Data |
|---|---|
| NULL | : |
| NULL | : |
| NULL | : |
| ESC | : Start Raw String |
| ESC | : Start of Data Packet (SDP) |
| DATA | : first byte of packet (LRH byte 0) |
| DATA | : second byte of packet |
| DATA | : third byte of packet |
| . | . |
| DATA | : fifth-to-last byte of packet |
| DATA | : fourth-to-last byte of packet |
| DATA | : third-to-last byte of packet |
| DATA | : second-to-last byte of packet |
| DATA | : last byte of packet |
| DATA | : vCRC[15:08] |
| DATA | : vCRC[7:00] |
| ESC | : End of Good Packet (EGP) |
| ESC | : VL, TBS, IP Message Header |
| DATA | : VL, TBS[11:08] |
| DATA | : TBS[07:00] |
| DATA | : IP (input port) |
| ESC | : End Raw String |
| NULL | : |
| NULL | : |
| NULL | : |

FIG. 14

METHOD AND SYSTEM TO CONTROL THE COMMUNICATION OF DATA BETWEEN A PLURALITY OF INTERCONNECT DEVICES

FIELD OF THE INVENTION

The present invention relates generally to the field of data communications and, more specifically, to a method and system of communicating data between a plurality of interconnect devices in a communications network.

BACKGROUND OF THE INVENTION

Existing networking and interconnect technologies have failed to keep pace with the development of computer systems, resulting in increased burdens being imposed upon data servers, application processing and enterprise computing. This problem has been exacerbated by the popular success of the Internet. A number of computing technologies implemented to meet computing demands (e.g., clustering, failsafe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The IBA supports a range of applications ranging from backplane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme may be employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few.

The physical properties of the IBA interconnect technology have been designed to support both module-to-module (board) interconnects (e.g., computer systems that support I/O module add in slots) and chasis-to-chasis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand™ Architecture Specification, showing the interconnection of processor nodes and I/O nodes utilizing the IBA switched fabric. It is however to be appreciated that IBA is merely provided as an example to illustrate an application of the invention.

SUMMARY OF THE INVENTION

In accordance with the invention, there is provided method of communicating data between a source interconnect device and a destination interconnect device, the method including:

adding an identification component to the data at the source interconnect device prior to communicating the data;

extracting the identification component at the destination interconnect device; and processing the identification component at the destination interconnect device, the identification component relating to the contents of the data.

Still further in accordance with the invention, there is provided a method of processing a data packet for communication between a source interconnect device and a destination interconnect device, the method including:

receiving the data packet;

extracting a payload from the packet and including the payload in a data element;

generating an identification component;

adding the identification component to the data element to define hub data; and communicating the hub data to the destination interconnect device.

In accordance with a further aspect of the invention, there is provided a method of processing data received at a destination interconnect device from a source interconnect device, the method including:

receiving hub data including an identification component and a data element, the identification component relating to the contents of the data element;

extracting the identification component from the hub data;

processing the identification component; and transmitting a data packet to another device dependent upon the processing of the identification component.

In accordance with a yet still further aspect of the invention, there is provided a system for communicating data, the system including:

a source interconnect device to receive the data and to add an identification component to the data to define hub data for communication via a hub, the identification component relating to the contents of the data; and a destination interconnect device connected to the hub to receive the hub data, the destination interconnect device extracting the identification component from the hub data and processing the identification component.

Still further in accordance with the invention, there is provided an interconnect device for processing a data packet for communication between the interconnect device and a destination interconnect device, the interconnect device including:

a receiver to receive the data packet;

a processor to extract a payload from the packet and include the payload in a data element, to generate an identification component, and to add the identification component to the data element to define hub data; and a transmitter to transmit the hub data to the destination interconnect device.

The invention extends to a machine-readable medium embodying a sequence of instructions that, when executed by a machine, cause the machine to execute a method described herein.

Other features of the present invention will be apparent from the accompanying drawings and from the detailed description that follows.

BRIEF DESCRIPTION OF THE DRAWINGS

The present invention is illustrated by way of example, and not limitation, with reference to the accompanying diagrammatic drawings, in which like references indicate the same or similar features.

In the drawings,

FIG. 6 shows a table of exemplary crossbar data, in accordance with one embodiment of the present invention;

FIG. 11 shows an exemplary transfer sequence of a normal packet across the crossbar;

FIG. 12 shows an exemplary transfer sequence of a truncated packet across the crossbar;

FIG. 13 shows an exemplary transfer sequence of a cancelled packet across the crossbar; and FIG. 14 shows an exemplary transfer sequence of a raw string across the crossbar.

DETAILED DESCRIPTION

A method and system to communicate data between a plurality of interconnect devices are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand™ architectured system, the teachings of the present invention may be applied to any interconnect device within any interconnect architecture.

Figure 1:
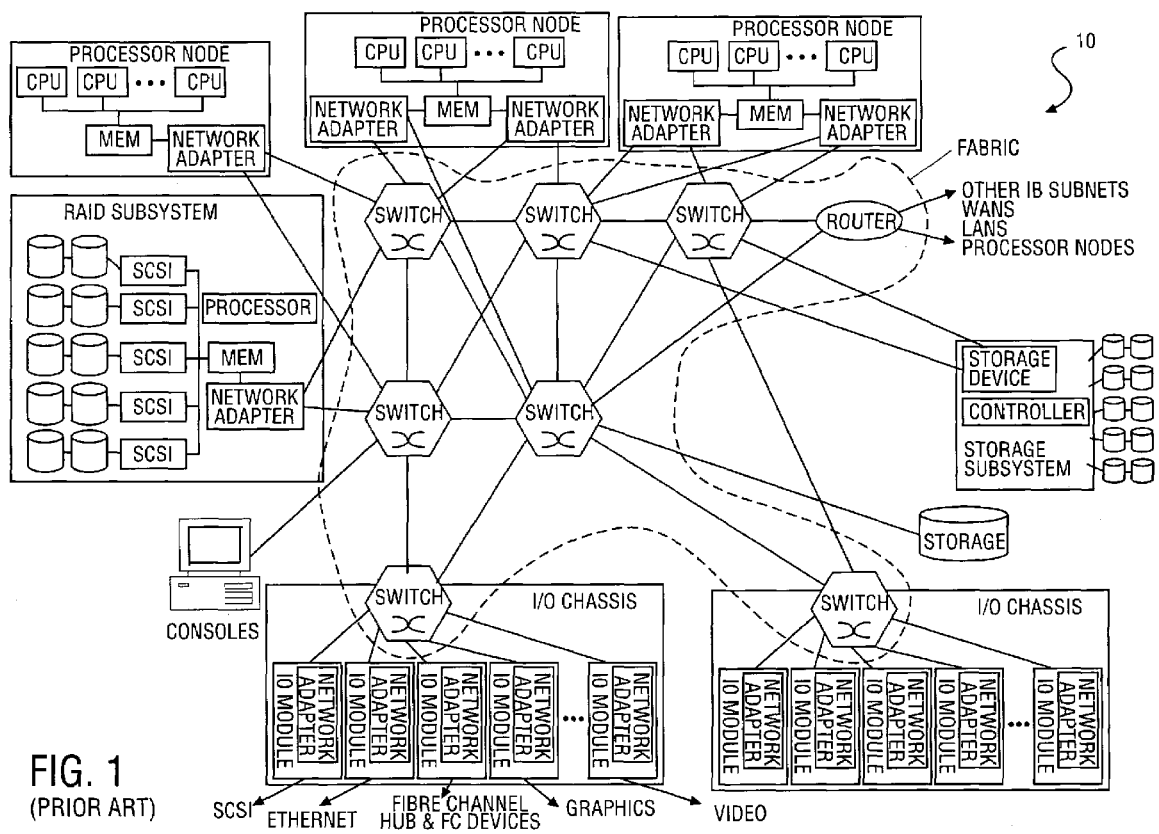
FIG. 1 shows a schematic representation of a System Area Network, according to the prior art, as supported by a switch fabric.
Figure 2A:
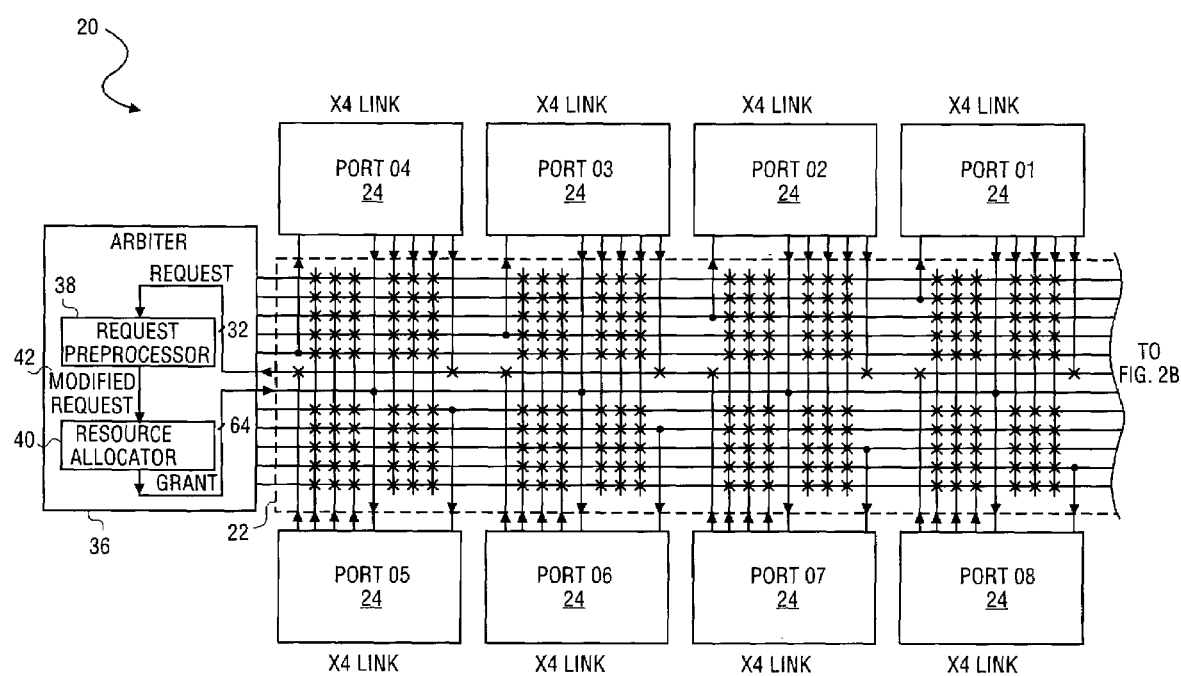
FIGS. 2A and 2B show a schematic representation of a datapath, according to an exemplary embodiment of the present invention, implemented within an interconnect device (e.g., a switch)
Figure 2B:
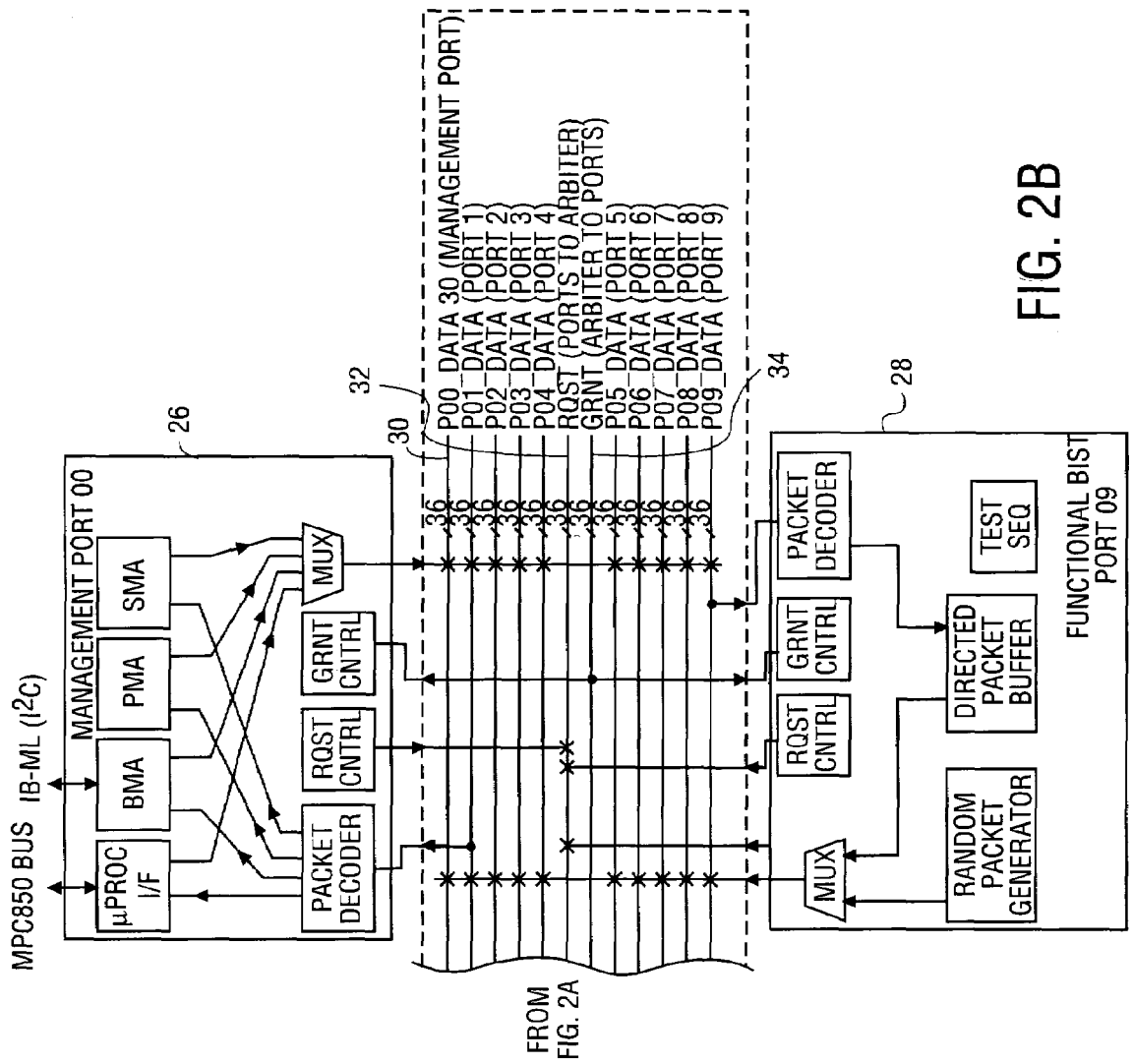

Referring to the drawings, FIGS. 2A and 2B provide a diagrammatic representation of a datapath 20, according to an exemplary embodiment of the present invention, implemented within an interconnect device (e.g., a switch). The datapath 20 is shown to include a crossbar 22 connected to I/O ports 24, a management port 26, and a functional Built-In-Self-Test (BIST) port 28. The crossbar 22 includes 10 bit data buses 30, a request bus 32 and a grant bus 34. In the exemplary embodiment, coupled to the crossbar 22 are eight communication ports 24 that issue resource requests to an arbiter 36 via the request bus 32, and that receive resource grants from the arbiter 36 via the grant bus 34.

The arbiter 36 includes a request preprocessor 38 and a resource allocator 40. The preprocessor 38 receives resource requests from the request bus 32 and generates a modified resource request 42 which is sent to the resource allocator 40. The resource allocator 40 then issues a resource grant on the grant bus 34.

In addition to the eight communication ports, the management port 26 and the functional BIST port 28 are also coupled to the crossbar 22. The management port 26 may, for example, include a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

In one embodiment, the functional BIST port 28 supports stand-alone, at-speed testing of an interconnect device of the datapath 20. The functional BIST port 28 may include a random packet generator, a directed packet buffer and a return packet checker. As described in more detail below, the BIST port 28 may use tags to communicate instructions or commands to an output port 24 via which it may communicate data.

In certain embodiments, the crossbar 22, forming part of a hub, is a 104-input×40-output×10-bit crossbar. Each input of the crossbar 22 may have a 6-bit address that may be presented to the crossbar 22 simultaneously with an associated data element. Each of the 10-bit datapaths of the crossbar 22 may define a byte lane. As described below, the first two bits of the byte lane may define the tag and the remaining eight bits may define the data element.

Figure 3:
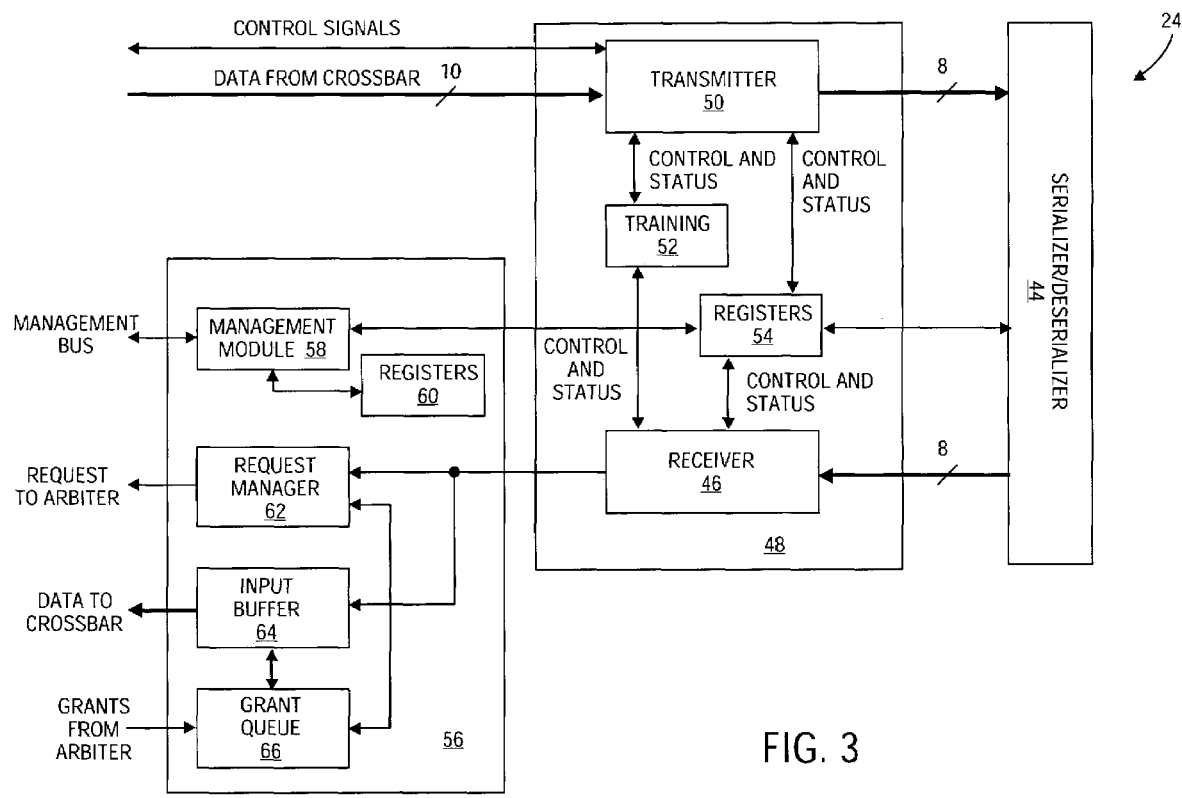
FIG. 3 shows a schematic representation of a communications port, according to an exemplary embodiment of the present invention, which may be employed within the datapath.

Turning now to the communication ports 24, FIG. 3 is a block diagram providing architectural details of an exemplary communications port 24, according to one aspect of the invention, which may be implemented within the datapath 20.

Those skilled in the art will appreciate that certain components of the port 24 have been omitted for the sake of clarity. Further, while the datapath 20 of FIGS. 2A and 2B is shown to include eight 4× duplex communication ports 24, the present invention is not limited to such a configuration. In one embodiment, each port 24 has one crossbar output group and its usage depends upon the configuration of the port 24. For example, in a 4× mode, the output group may function as a single 4× channel. However, in a 1× mode defining four 1× channels, each byte lane may be dedicated to a 1× subport with the same numerical designation. Each port 24 (e.g. PM4Cs) may have three crossbar input groups and a port 24 may use four byte lanes of an input group to send a packet to another 4× output port 24. In certain embodiments, a port 24 may use the byte lanes separately to send packets to as many as four different 1× output ports simultaneously. The transfer rate of data through the crossbar 22 (4× or 1× configuration) may match the speed of the output port 24. In certain embodiments, the ports 24 may have a mix of 4× and 1× ports and, to this end, all the ports 24 may be capable of driving the crossbar 22 in either the 4× mode or the 1× mode.

Each communications port 24 is shown to include Serializer-Deserializer circuits (SerDes) 44 via which 32-bit words are received at, and transmitted from, the port 24. Each SerDes 44 operates to convert a serial, coded (8B1OB) data bit stream into parallel byte streams, which include data and control symbols.

In one embodiment, data received via the SerDes 44 at the port 24 is communicated in parallel to a receiver 46 of a Phy-Link Interface (PLI) 48. The receiver 46 may also resolve clock mismatch and lane-to-lane skew. In certain embodiments, the receiver 46 detects special character sequences to aid in the training and initialization procedures. A transmitter 50 is provided to transmit data received from the crossbar 22 to the SerDes 44. In certain embodiments, the transmitter 50 inserts cyclic redundancy checks (CRCs) and control delimiters prior to passing the data on to the SerDes 44. The tag, described in more detail below, may command the transmitter 50 to schedule special character sequences for training, clock alignment, and lane alignment. In addition, the transmitter 50 may send link packets when requested by a flow control unit 56, and forward Total Blocks Sent (TBS) information to the flow control unit 56. Link training and initialization may be selectively performed by a training module 52, and a register interface 54 contains a PLI subset of link registers.

The flow control unit 56 includes a management module 58 and its associated registers 60, a request manager 62 for managing requests from the port 24 to the arbiter 36, an input buffer 64 that communicates data to the crossbar 22, and a grant queue 66 that queues grants received from the arbiter 36. The request manager 62 manages requests to the arbiter 36 to communicate data via the request bus 32.

In certain embodiments, the input buffer 64 is a 20 Kbyte input buffer, the capacity of which is divided equally among data virtual lanes (VLs) supported by the datapath 20. Virtual lanes are, in one embodiment, independent data streams that are supported by a common physical link. Further details regarding the concept of "virtual lanes" is provided in the InfiniBand™Architecture Specification, Volume 1, Oct. 24, 2000.

In one embodiment, the input buffer 64 of each port 24 is organized into 64-byte blocks, and a packet may occupy any arbitrary set of buffer blocks. A link list keeps track of packets and free blocks within the input buffer 64. Each input buffer 64 may have three read port-crossbar inputs via which data is passed to the crossbar 22.

In certain embodiments, the routing request sent by a port 24 includes, a request code identifying the request type, an input port identifier that identifies the particular port 24 from which the request was issued, and a request identifier or "handle" that allows the port 24 to associate a grant received from the arbiter 36 with a specific packet. For example, the request identifier may be a pointer to a location within the input buffer 64 of the particular communications port 24. The request identifier is necessary as a particular port 24 may have a number of outstanding requests that may be granted by the arbiter 36 in any order.

Figure 4:
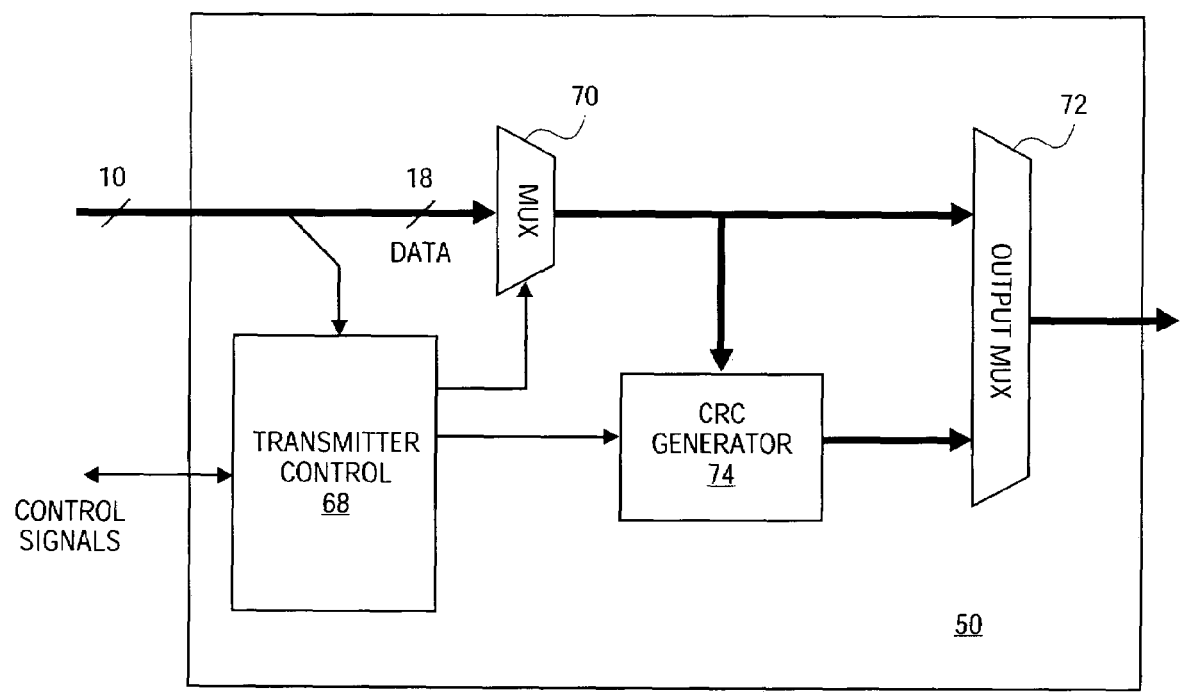
FIG. 4 shows a schematic representation of a data transmission module of the port of FIG. 3.

In certain embodiments, the transmitter 50 (see FIGS. 3 and 4) includes a transmitter control 68, an input multiplexer (MUX) 70 which receives data from the crossbar 22, an output MUX 72 which feeds data to the SerDes 44, and a CRC generator 74 for generating CRC information which is combined with its associated data by the output MUX 72. As described in more detail below, 10 bit data is communicated across each byte lane of the crossbar 22, wherein two of the 10 bits define the tag that identifies the content of the other 8-bits, which define a data element. In order to facilitate the exemplary description of the invention, data received by, and communicated from a port 24 to an external device, e.g. another switch, network adaptor, processor or the like, is referred to as a "packet" and data communicated across the hub or crossbar 22 is referred to as a "byte lane data". It will be appreciated that the terms should not in any way be interpreted restrictively.

A packet length identifier provides information to the arbiter 36 regarding the length of a packet associated with a request from a source or input port 24. A destination or output port identifier of the routing request identifies a communications port 24 to which the relevant packets should be directed. In lieu of an output port identifier, the destination routing request includes a destination address and a partition key. A destination routing request may also include a service level identifier, and a request extension identifier that identifies special checking or handling that should be applied to the relevant destination routing request. For example, the request extension identifier identifies that an associated packet is a subset management packet (VL15), a raw (e.g., non-InfiniBand™) packet, or a standard packet where the partition key is valid/invalid.

A credit update request may be provided that includes a port status identifier that indicates whether an associated port, identified by the port identifier, is online and, if so, the link width (e.g., 12×, 4× or 1×). Each credit update request also includes a virtual lane identifier and a flow control credit limit.

As mentioned above, data is communicated across the crossbar 22 in the form of 10 bit byte lane data 80 (see FIG. 6). In the embodiment of the invention depicted in the drawings, the first 2 bits of the 10 bit lane data define a tag 82 and the remaining 8 bits define a data element 84, the meaning or nature of which is defined by the tag 82. It will be appreciated that, as the tag 82 is defined by two bits, four different scenarios may be defined by the tag 82. It is however to be appreciated that, dependent upon the size of the crossbar 22, tags 82 and data elements 84 with different sizes may be provided.

In one embodiment of the invention, the tag 42 may identify the contents of the data element 84 in the following fashion. In particular, a tag value of "00" may define a null indicating to the receiving port 24 that no action is required by the receiving port 24. For example, under these circumstances, a value of "00000000" is provided in the data element 84 and any other value in the data element 84 may be regarded as invalid or illegal for the particular system.

A value of "01" in the tag 82 may identify an "escape" configuration in which the data element 84 defines various escape modes as discussed in more detail below.

A value of "10" in the tag 82 may indicate or identify that the data element 84 includes packet data and, accordingly, the value included in the data element 84 is then dependent on the data in the packet to be communicated across the crossbar 22.

Finally, a value of "11" in the tag 82 may identify or define a mark that the data element 84 includes the last data byte of a good packet. Thus, the tag 82 allows the input or source port 24 to identify the nature of the data that it provides in the data element 84 and, in response there to, the output or destination port 24 acts accordingly, as discussed in more detail below.

Returning to the escape code "01" in the tag 82, the value of the data element 84 may identify up to 256 different commands and or data identifiers. In one embodiment, a value of "00000000" defines a null and introduces an intra-packet gap. A value of "00000010" may define a virtual lane (VL), TBS data, and an input port message header. A value of "00000011" may define a virtual lane, TBS data, an input port message header for a packet with a lifetime timeout error. A value of "00000100" may define an end of a bad packet (EBP). Thus, the escape codes mentioned above, may identify or provide information to the output port 24 regarding the data which has been communicated to the port 24.

In certain embodiments, the escape code defines commands to the output port 24. For example, as shown in FIG. 6, the data value included in the data element 84 of the lane data 80 may instruct the port 24 to insert, for example, a comma, a start of data packet, a start of link packet, an end of good packet, an end of bad packet, a pad, a skip, and various other commands. In addition, the escape code may identify the start of a raw string using, for example, a code "11110000" or an end of a raw string, for example, using a code "11110001". In the particular embodiment shown in the drawings, only a few of the values included in the data element 84 have been used and the others are reserved for other functions.

Figure 5:
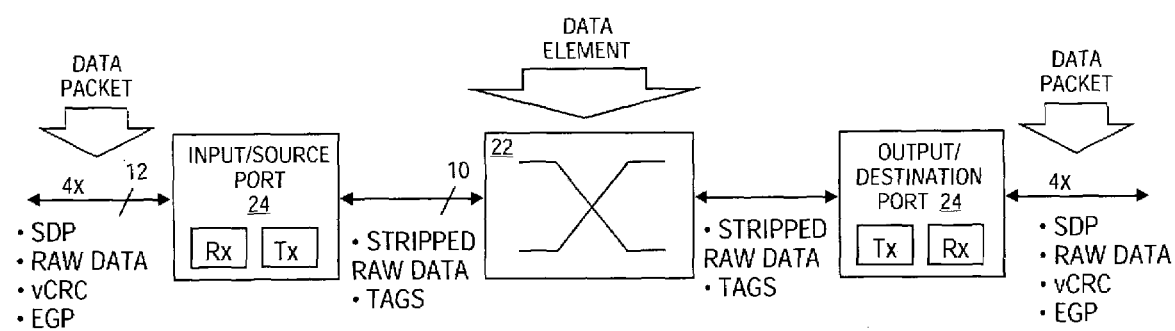
FIG. 5 shows a simplified schematic representation of an input port and output port of the datapath of FIG. 2 wherein data is communicated between the two ports via a crossbar.
Figure 7:
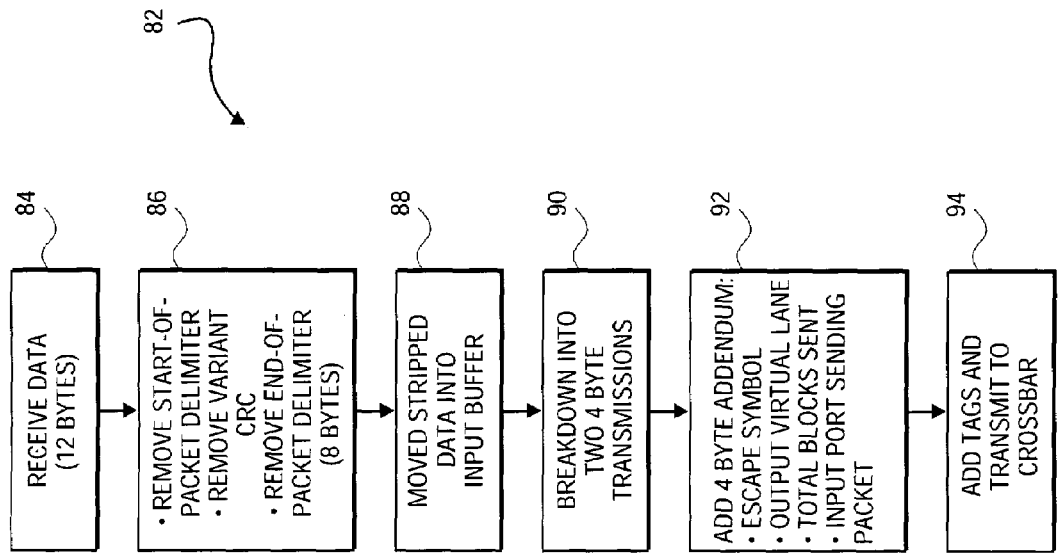
FIGS. 7 and 8 show flow diagrams of methods, according to exemplary embodiments of the present invention, for communicating data packets between a plurality of interconnect devices via the crossbar.

Referring in particular to FIG. 5, a simplified hardware architectural diagram of the data path 20 (see FIG. 2) is shown when a data packet is received by the input or source port 24 for communication via the crossbar 22 to an output or destination port 24. The communication of the packet is explained with reference to an exemplary method, in accordance with one aspect of the invention, of communicating data between two interconnect devices, as generally indicated by reference numeral 82 (see FIG. 7).

As shown at block 84, the input port 24 (see FIG. 5) receives a data packet of 12 bytes from any other device e.g. an external device. The data packet typically includes a header that defines the start of the data packet (SDP), followed by a payload that includes raw data, and terminates with a trailer that includes variant CRCs (vCRCs) and an end of a good packet (EGP) identifier.

The input or source port 24 then processes the data packet to remove the SDP, the vCRCs, and the EGP delimiters to extract the raw data. It is to be appreciated that if the packet has a different format including further delimiters, these may also be removed to extract the raw data included in the payload. In the present example, the 12-byte data packet is reduced to 8 bytes of raw data as shown at block 86. Thereafter, the raw data, which has been stripped from the data packet, is moved into the input buffer 64 (see FIG. 3) as shown at block 88. The 8-byte raw data is then broken down into two 4-byte sections (see block 90) and a 4-byte addendum is then added to the raw data as shown at block 92. In particular, the 4-byte addendum includes an escape symbol to identify the addendum, an output virtual lane (VL), TBS data, and an identifier that identifies the input port sending the packet. The input port 24 then adds the appropriate tags 82 to define byte lane data that is then transmitted to the output or destination port 24 via the crossbar 22. Thus, a data packet received by the input or source port 24 has been stripped to provide only the raw data that is then included with a 4-byte addendum and the tag 82 to define byte lane data. The lane data is then transmitted across the crossbar 22 to the output port 24, as shown at block 94.

Figure 8:
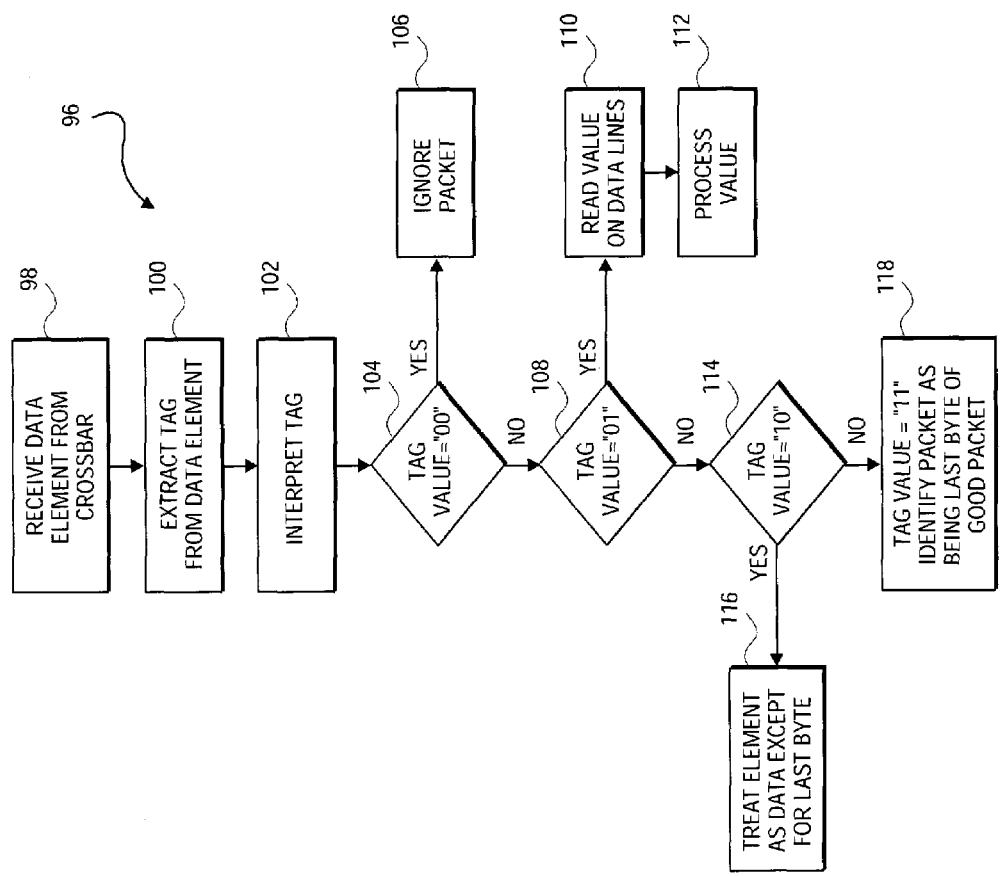

Referring in particular to FIG. 8, reference numeral 96 generally indicates an exemplary method, in accordance with a further aspect of the invention, for communicating data between two interconnect devices. In one embodiment, the method 96 interprets the tags 82 at an output port 24.

As shown at block 98, the output port 24 receives the lane data 80 from the crossbar 22 and, thereafter, extracts the tag 82 from the lane data 80 as shown at block 100. The tag 82 is then interpreted (see block 102) to identify the code included in the tag 82. As shown at block 104, if the tag 82 includes a value of "00", this may signify or identify to the output 24 that the lane data 80, and thus the data packet, is to be ignored as shown at block 106.

If, however, the tag 82 does not include a value "00", the method 96 proceeds to decision block 108 where it checks to see whether or not the tag 82 includes a value of "01". If so, the output port 24 then identifies that the tag 82 includes an escape code and the output port 24 responds dependent upon the data included in the data element 84. In order to do so, the output port 24 reads the value of the data element 84 (see block 110) and, as shown at block 112, processes the data. For example, if the value in the data element 84 is "00000100", this may inform the output port 24 that it is an end of a bad packet and, if the data value is "11000000", the output port may be instructed to insert a comma in the data packet which it constructs and sends to an external device.

Returning to decision block 108, if the value included in the tag 82 is not "01" then the method 96 checks to see whether or not the value included in the tag 82 is "10" as shown at block 114. If the value is "10" then the output port 24 is instructed to treat the value in the data element 84 as raw data, as shown at block 116.

If, however, the value in tag 82 is not "10" then the method 96 checks to see whether or not the value in the tag 82 is "11" as shown at block 118. As discussed above, the value "11" in the tag 82 identifies the packet as being the last byte of a good packet.

In certain embodiments of the invention, data may be communicated across the crossbar 22 in a normal packet transfer sequence (see FIG. 11), a truncated packet transfer sequence (see FIG. 12), a cancelled packet transfer sequence (see FIG. 13), and a packet in a raw string sequence (see FIG. 14). In certain embodiments, all transmission across the crossbar 22 are a multiple of four bytes in length and 4× transfers are word aligned. For example, the first byte of a transmission may be sent on byte lane 0, and the last word of a transmission may be sent on byte lane 3.

In the normal packet transfer sequence, as shown in FIG. 11, the tag 82 includes a value "10" thereby to signify or indicate that the data included in the data element 84 is packet data or data from the payload of the data packet received at the input port 24. As each byte of data from the payload of the data packet is communicated across the crossbar 22, the tag 82 retains a value of "10" and, when the last byte of the packet is to be communicated, the tag 82 changes its value to "11" thereby to mark that the byte is in fact the last byte of a good packet. Thereafter, the tag 82 includes an escape code "01" followed by a value of "00000010" to inform or indicate to the output port 24 that the data in the following bytes will provide VL, TBS, and Input Port (IP) message header information. Accordingly, the tag 82 changes its value to "10" and an addendum formed by the VL, TBS, and input port identifier are provided by the input port 24 across the crossbar 22 to the output port 24.

Packets may however be truncated during virtual cut through transfers if a receiver 46 detects an error after a transfer has begun. As shown in FIG. 12, when a truncated packet transfer sequence occurs, the tag 82 may include a "10" code while the data is communicated across the crossbar 22. However, in the event that a bad packet is communicated, the input port 24 provides an escape "01" and a value of "11000100" in the data element 84 thereby to indicate an end of a bad packet. The value of the following tag 82 may be repeated, and thus also include "01", but include "00000010" in the data element 84 to provide VL, TBS, and input port message header information to the output port 24. As described above, once the output port 24 has been notified that escape data is to follow, the tag 82 then identifies that the data is included by providing the "10" code in the tag 82. The data in the following data element 84 includes VL, TBS, and input port data. Thus, unlike a normal packet transfer that terminates in the mark code ("11" in the tag 82 and packet data in the data element 84), a truncated packet terminates with an escape code ("01" in the tag 82 and "00000100" in the data element 84).

Packet transfers may be cancelled, for example, if a reception error is detected between the time a request was issued or sent by the port 24 to the arbiter 36, and the port 24 receives a good grant authorizing the communication of the data. When the packet transfer has been cancelled, as shown in FIG. 13, the input port 24 may include the escape code "01" in the tag 82 and the corresponding data in the data element 84 is then "00000010". Thereafter, in a similar fashion to that described above, the tag 82 includes a data identifier "10" in the tag 82 and VL, TBS, and input port data is then included in the data element 84. Even though packet data may not be sent to the output port 24, the line data 80 may still be sent to the output port 24, for example, to update a local copy of TBS data at the output port 24. However, in the case of a bad grant, no line data may be sent across the crossbar 22.

In the communication of data across the crossbar 22 described above, a packet may be received by the input port 24, stripped of certain values, and communicated to the output port 24 with tag information added thereto. Thus, the lane data across the crossbar 22 may exclude a start-of packet delimiter (e.g. 1 byte), variant CRC information (2 bytes), and/or an end-of-packet delimiter (e.g. 1 byte). These delimiters may then be added back at the transmitter 50 of the output port 24 (see FIG. 4). Data transfers through the crossbar 22 may thus, in certain embodiments, only include packet data and the 4-byte addendum. The addendum may occupy the space left by the missing packet delimiters and vCRC. In certain embodiments, the addendum may be defined by an escape code in the tag 82, a virtual lane (VL) output of the packet, TBS data after the present data has been sent, and the input port 24 from which the packet was sent. In certain circumstances with the transfer of VL15 packets, the TBS data may be ignored.

However, for example, when the BIST port 28 is operational, it may communicate raw data to any one or more of the output ports 24 for initialization, testing, or any other purpose. In these circumstances, the BIST port 26 may, for three consecutive bytes include a "00" value in the tag 82 followed by an escape code "01" in the tag 82 to identify a start of a raw string. The lane data 80 (see in FIG. 6) identifies the start of a raw string by a value of "11110000" in the data element 84. Thereafter, the tag 82 includes an escape code "01" with a value of "11000001" in the data element 84 to identify a start of a data packet. The value of the tag 82 is then changed to "10" to identify that the data of the payload of the received packet is included in the data element 84. The value of "10" in the tag 82 remains constant while the bytes of data are being communicated across the crossbar 22.

However in the raw string configuration, the output port 24 does not alter the data received. Thus, for example, the output port 24 does not include or insert its own vCRC information but merely acts as a conduit for the data that has been included by the BIST port 28. Thus, as can be seen in FIG. 14, when the last byte of the packet as well as the vCRC is communicated by the BIST port 28, the value of the tag 82 remains unchanged at "10" so that the output port 24 does not alter the values or include its own values in the data packet sent, for example, to the external device. In certain embodiments, the BIST port 28 may however include an escape code "01" to instruct the output port 24 to include end of good packet (EGP), VL, TBS, and input port message data. The end of a raw string may be defined by a further "01" code in the tag 82 followed by a "11110001" value in the data element 84 and, finally, by three repetitive null values identified by a value of "00" in the tag 82.

Figure 9:
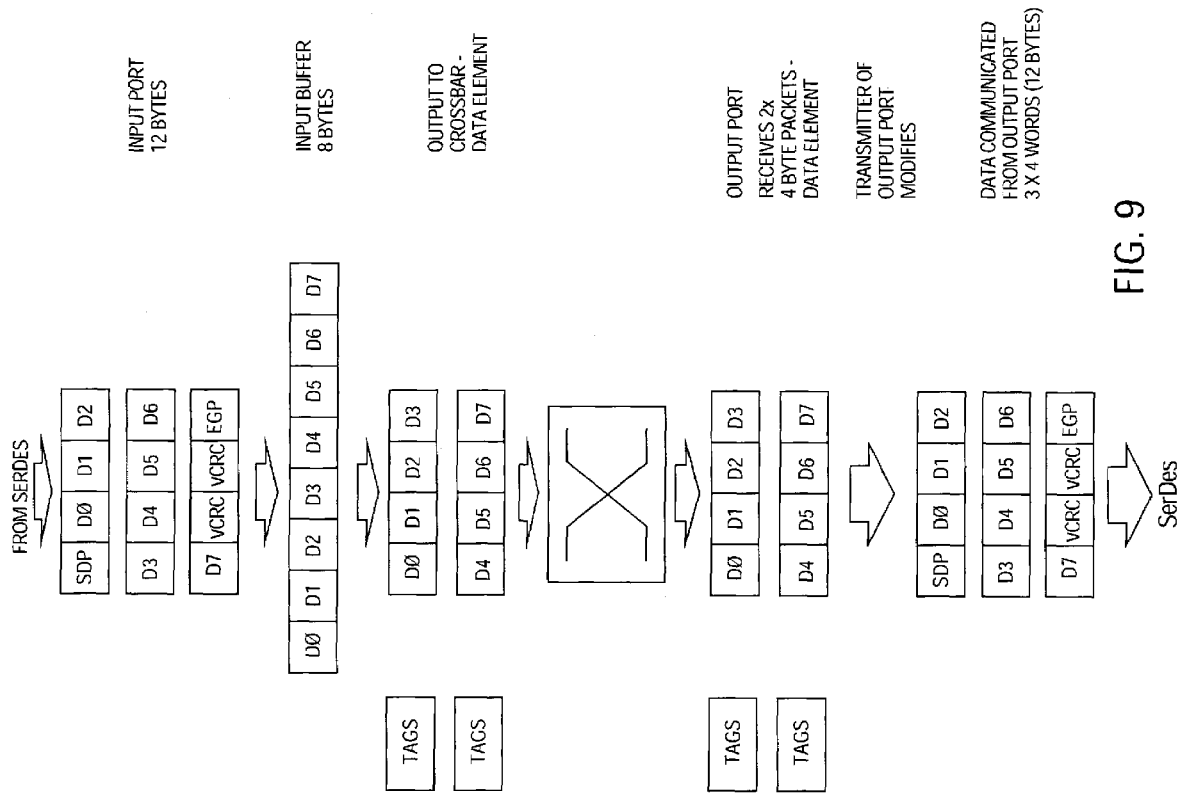
FIG. 9 shows a schematic representation of the methods of FIGS. 7 and 8 applied to exemplary data communicated between the input and output ports of the datapath.
Figure 10:
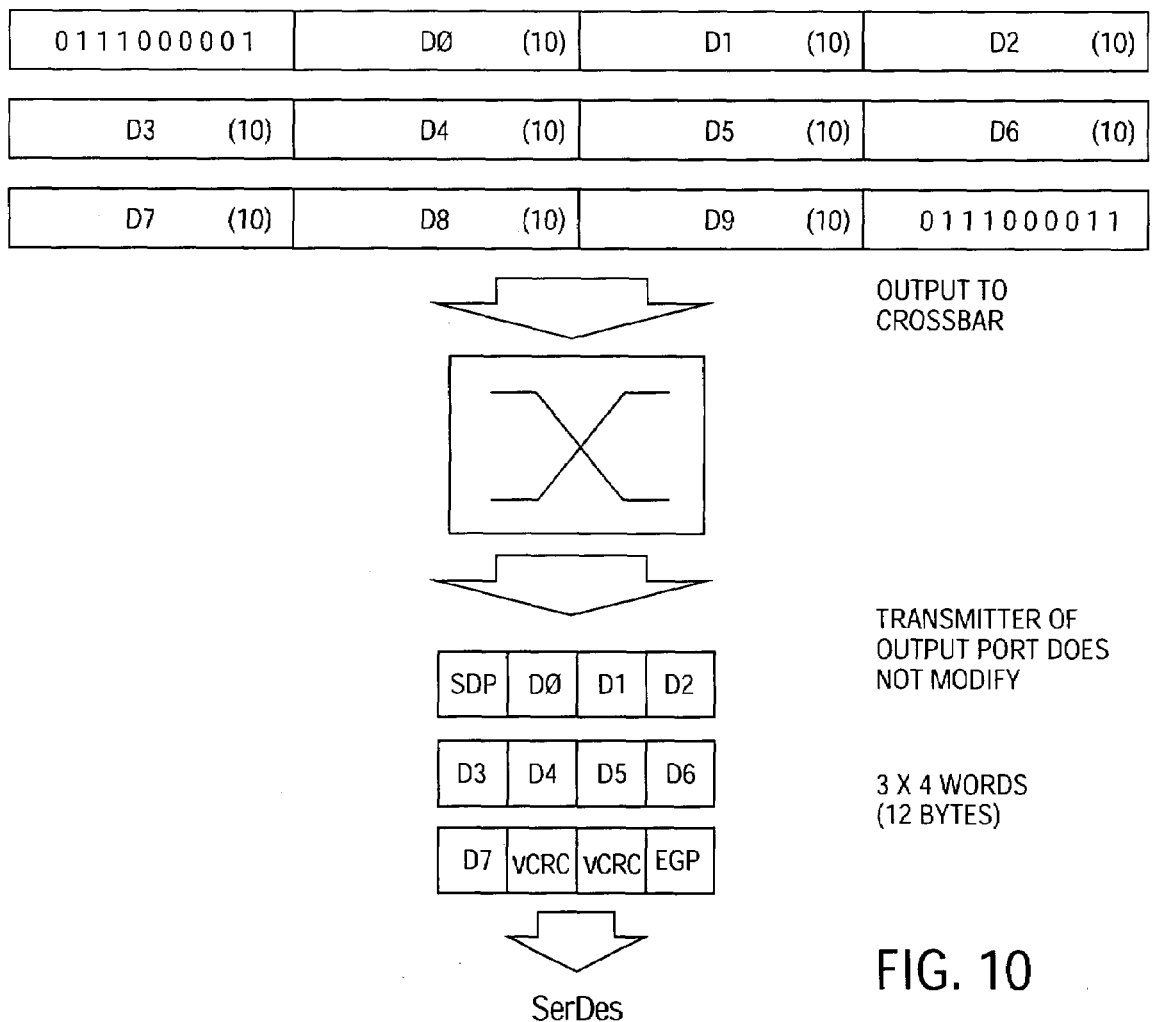
FIG. 10 shows a schematic representation of the methods of FIGS. 7 and 8 applied to exemplary data communicated between a BIST port and an output port.

Thus, using the escape codes of "01" in the tag 82, an input port 24, management port 26, or the BIST port 28 can communicate certain instructions or commands to the output port 24. When data is merely communicated from an input port 24 to an output port 24, the output port 24 performs its own vCRC on the data included in the data element 84 and includes the resulting vCRC in the data packet which is communicated to an external device connected to the output port 24 (see FIGS. 5 and 9). However, when the BIST port 28 performs certain initialization and checking operations, it may instruct the output port 24, using the escape code "01", not to insert any vCRC values into the data packet and, accordingly, the particular bytes of the data packet are thus treated by the output port 24 as data. Accordingly, the output port 24 acts as a conduit and the best 28 may thus define the value of the VCRC included in the data packet for communication to the external device (see FIG. 10).

As mentioned above, the escape code "01" may be used to command an output port 24 to pass the data through unchanged. Accordingly, the BIST port 28 may thus reject error packets across the hub. The error packets may be passed on to a destination port 24 to test error handling capability of the destination port 24. Thus, packets may be generated by the BIST port 28 and passed via a first port 24 to a second port 24 wherein it appears to the second port 24 as if the packet was sent from an external or off-chip device.

In one embodiment the tag 82 is used to inject idle cycles into the datapath 20. In particular an escape code of "01" followed by "11001100" in the data element 84 injects an idle cycle into the output port 24.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). A few examples of a machine readable storage medium includes read only memory (ROM); random access memory (RAM); magnetic disk storage media; optical storage media; and flash memory devices. A few examples of a machine readable transmission medium includes electrical, optical, acoustical or other form of propagated signals (e.g., carrier waves, infrared signals, digital signals, etc.).

What is claimed is:

1. A method of stripping header information from a data packet received at a source port of an interconnect device and appending thereon to at least a portion of the stripped raw data, tag bits that are interpreted at a destination port of the interconnect device for deriving information about the data packet at the destination port, or for responding to instructions related to carrying out specific actions at the destination port, the method including:

receiving the data packet at the source port of the interconnect device;

stripping away header information from the data packet for extracting a payload from the data packet;

generating a tag containing two tag bits that provide four types of information, the four types of information including a) a null code for indicating that no action is required at the destination port, b) an escape code for indicating that the payload contains one of a first value that is to be interpreted at the destination port for deriving information about the data packet or a second value that is an instruction to the destination port for carrying out a specified action in the destination port, c) a data code for indicating that the payload contains data other than a last data byte, and d) a mark code for indicating that the payload contains the last data byte of a good data packet;

appending the tag to the extracted payload;

communicating the tag and the payload to the destination port of the interconnect device; and interpreting the tag at the destination port, the interpreting comprising:

identifying the escape code when present in the tag, reading the contents of the payload for identifying the presence of the second value, interpreting the second value, and in response thereto carrying out the specified action at the destination port.

2. The method of claim 1, wherein the specified action comprises inserting one of a comma, a start of data packet, a start of link packet, an end of good packet, an end of bad packet, a pad, and a skip, into the payload, at the destination port.

3. The method of claim 1, wherein interpreting the tag at the destination port further comprises:

identifying the escape code when present in the tag, reading the contents of the payload for identifying the presence of the first value, interpreting the first value as indicative of the data packet comprising one of Virtual Lane (VL) data, Total Blocks Sent (TBS) data, input port message header data, lifetime timeout data, a start of a raw string, and an end of a raw string.

4. The method of claim 1, wherein stripping header information includes removing a start of packet delimiter and variant CRC information from the data packet.

5. The method of claim 1, wherein the tag and the extracted payload are propagated from the source port to the destination port via a crossbar using a 10 bit bus, wherein the tag is defined by two bits and the payload is defined by eight bits.

6. The method of claim 1, wherein interpreting the tag at the destination port further comprises:

identifying the null code when present in the tag, reading the contents of the payload for identifying the presence of an all-zero condition which indicates that no action is required to be taken at the destination port.

7. The method of claim 1, wherein interpreting the tag at the destination port further comprises:

identifying the data code when present in the tag, and interpreting the data code as indicative of the payload carrying packet data other than a last byte.

8. The method of claim 1, wherein interpreting the tag at the destination port further comprises:

identifying the mark code when present in the tag, and interpreting the data code as indicative of the payload carrying the last byte of a good data packet.

* * * * *